United States Patent [19]

Stewart et al.

[11] 4,332,218
[45] Jun. 1, 1982

[54] SUPPORT SYSTEM FOR A FLUIDIZED BED

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 233,499

[22] Filed: Feb. 11, 1981

Related U.S. Application Data

[63] Continuation of Ser. No. 158,496, Jun. 11, 1980, abandoned, which is a continuation of Ser. No. 948,130, Oct. 3, 1978, abandoned.

[51] Int. Cl.³ .............................................. F22B 1/02
[52] U.S. Cl. .................................... 122/4 D; 34/57 A; 110/245; 110/263; 165/104.16; 431/7; 431/170
[58] Field of Search ............... 122/4 D; 110/245, 263; 34/57 A; 431/7, 170; 165/104.16

[56] References Cited

U.S. PATENT DOCUMENTS 2,614,034 10/1952 Brummerstedt ................. 110/263 X
2,971,242 2/1961 Doleman et al. ............... 34/57 A X
3,625,165 12/1971 Ishigaki ................................ 110/245
3,881,857 5/1975 Hoy et al. ................................ 431/7
3,914,089 10/1975 Desty et al. ............................ 431/7
3,915,657 10/1975 Staffin et al. ......................... 23/284
4,090,852 5/1978 Dowd ............................. 34/57 A X Primary Examiner—Edward G. Favors
Attorney, Agent, or Firm—Marvin A. Naigur; John E. Wilson; Warren B. Kice

[57] ABSTRACT

A system for supporting a fluidized bed in a boiler in which a plurality of support frames are supported in an abutting relationship spanning the interior of the boiler. One or more of the support frames are connected or attached relative to each other and to their supports in a manner to permit limited relative movement between the frames and between each frame and its support. A grid is supported by each frame and is connected or attached thereto in a maner to permit limited movement of the grid relative to the frame.

15 Claims, 7 Drawing Figures

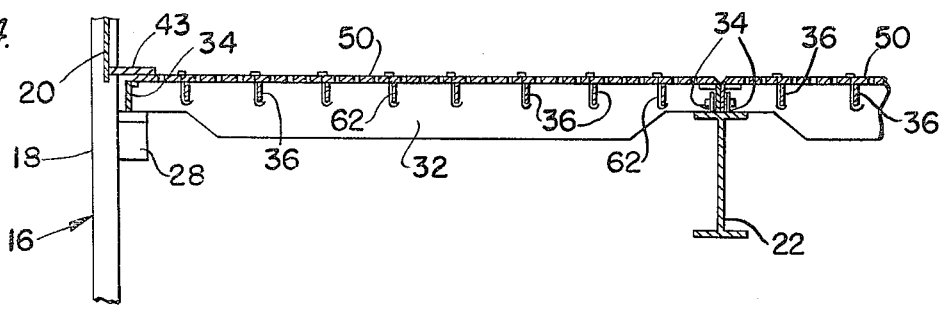
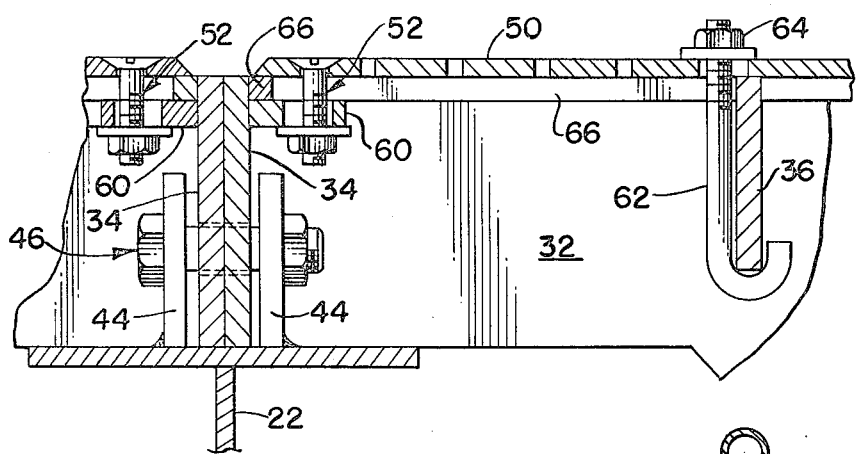
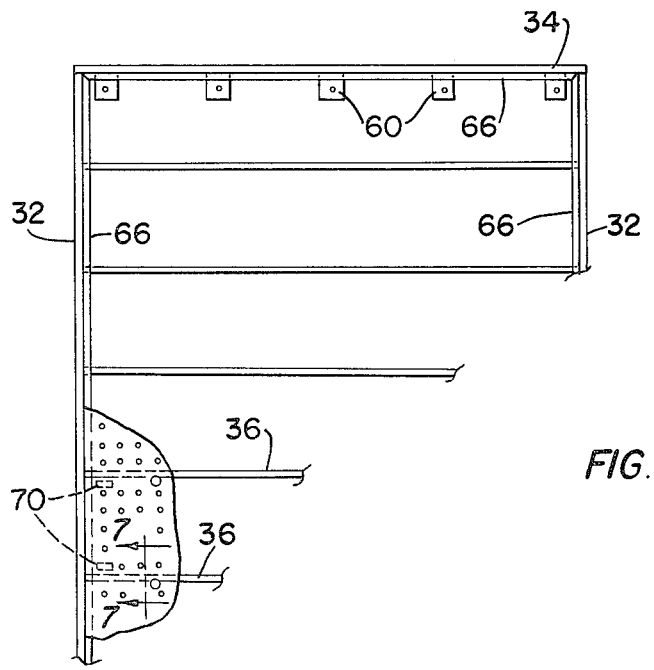
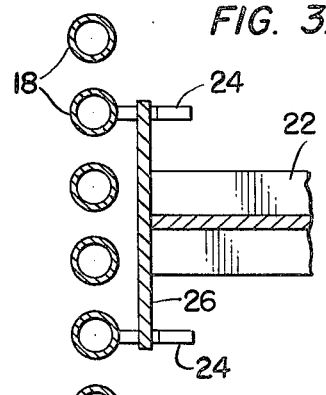
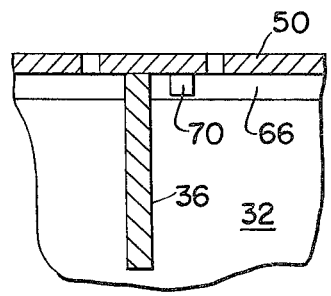

SUPPORT SYSTEM FOR A FLUIDIZED BED

This is a continuation of application Ser. No. 158,496, filed Jun. 11, 1980, which is a continuation of Ser. No. 948,130, filed Oct. 3, 1978 both are now abandoned.

BACKGROUND OF THE INVENTION

This invention relates to a support system and, more particularly, to a system for supporting a fluidized bed in a boiler.

In a fluidized bed boiler, air is normally passed upwardly through a mass of particulate material including a particulate fuel, causing the material to expand and take on a suspended or fluidized state. Combustion of the fuel material produces heat which is transferred to a heat exchange medium, such as water, passing through tubes, or the like, located proximate to the fluidized bed. In these arrangements one or more perforated plates, or grids, is mounted relative to the boiler walls by a supporting structure and receives the particulate material while permitting the air to pass into the material.

Since the design of the grid and the support structure are completely different both from a materials and size standpoint, the grid and its supporting structure undergo significant relative expansion in response to the high temperatures encountered in the boiler. This expansion, if not adequately accommodated, can result in failure of either the grid, its supporting structure or both. Also, the grids are very difficult to remove and install due to their bulkiness and weight, especially if they are in the form of a single plate.

SUMMARY OF THE INVENTION

It is therefore an object of the present invention to provide a supporting system for a fluidized bed in which a plurality of grid sections are supported by a plurality of support frames in a manner to accommodate relative movement between the grid sections and the frames.

It is a further object of the present invention to provide a system of the above type in which the support frames are supported relative to an understructure in a manner to permit relative movement between the frames and the understructure.

It is a further object of the present invention to provide a system of the above type in which two or more of the support frames are attached or connected together in a manner to permit limited relative movement therebetween.

It is a still further object of the present invention to provide a system of the above type in which the grid sections are easily installed, removed and replaced.

Toward the fulfillment of these and other objects, the system of the present invention comprises support means for supporting a plurality of frames in an abutting relationship spanning the interior of the boiler. At least a portion of the frames are connected or attached to each other and to the supporting means in a manner to permit limited relative movement between the frames and between each frame and the supporting means. A grid is supported by each frame, and means are provided for connecting or attaching each grid to its respective frame while permitting limited relative movement between the grid and the frame.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein:

FIG. 3 is a cross-sectional view taken along the line 3—3 of FIG. 2;

FIG. 4 is a cross-sectional view taken along the line 4—4 of FIG. 1;

FIG. 5 is an enlarged view of a portion of the structure depicted in FIG. 4;

FIG. 6 is a bottom enlarged partial plan view of a support frame utilized in the embodiment of FIGS. 1-5; and FIG. 7 is a cross-sectional view taken along the line 7—7 of FIG. 6.

DESCRIPTION OF THE PREFERRED EMBODIMENT

Figure 1:
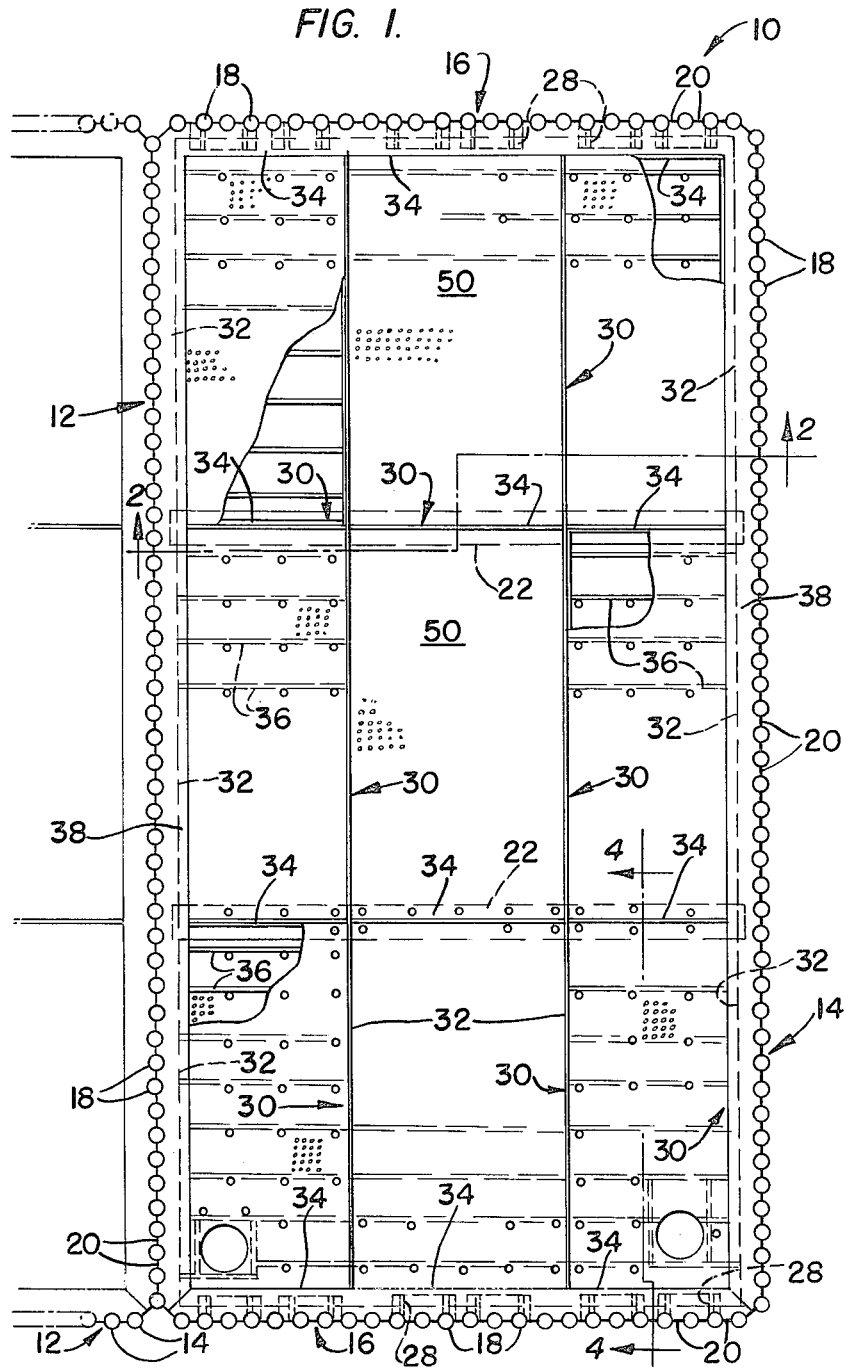
FIG. 1 is a top plan view of a portion of a boiler depicting a boiler section incorporating the support system of the present invention.
Figure 2:
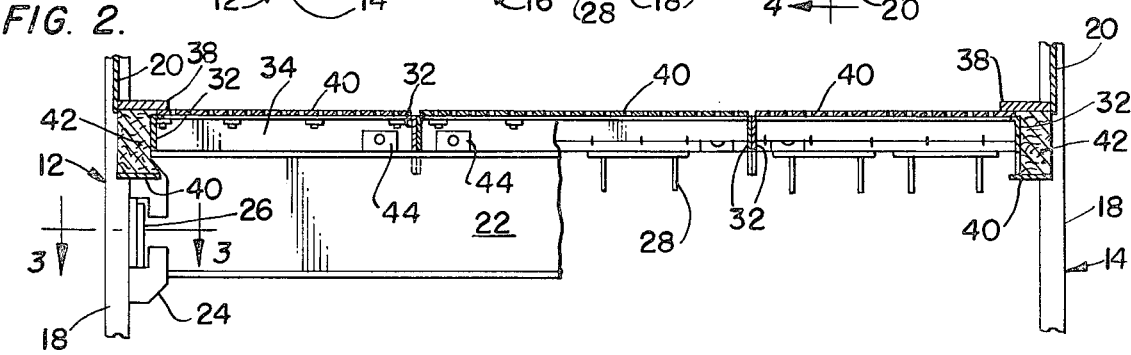
FIG. 2 is a cross-sectional view taken along the line 2—2 of FIG. 1.

Referring specifically to FIGS. 1 and 2 of the drawings the reference numeral 10 depicts in general a boiler section defined by a front wall 12, a rear wall 14, and two sidewalls 16. Each wall consists of a plurality of vertically extending water tubes 18 having fins 20 extending from diametrically opposite portions thereof, with the fins of adjacent tubes being connected together to form an airtight wall. The fins may be integrally formed with the tubes or welded thereto in a conventional manner.

As indicated by FIG. 1 the entire boiler can consist of two or more boiler sections 10 with the front wall 12 acting as a common wall between adjacent sections. For the convenience of presentation only one such section 10 will be described in detail.

A pair of support beams 22 extend across the boiler section 10 between the front wall 12 and the rear wall 14 in a spaced relationship. As better shown in FIGS. 2 and 3, each end of the beams 22 is connected relative to the inner walls 12 and 14 by a pair of C-shaped support lugs 24 which are respectively welded to the inner surfaces of two tubes forming each wall, and a mounting bar 26 which extends within the slots formed in the lugs 24 and which is welded to the corresponding end of the beams.

As better shown in FIGS. 1 and 2, a plurality of support members 28 are welded to the inner surfaces of the sidewalls 16 and extend in a spaced relationship with their upper surfaces extending at the same level as the upper surfaces of the beams 22.

As shown in FIG. 1 a plurality of frame sections 30 are supported on the boiler beams 22 and the support members 28 and extend in three rows of three frames per row in the space defined by the walls 12, 14, and 16. Each frame section 30 is formed by a pair of spaced front and rear frame members 32 and a pair of spaced side frame members 34 interconnected in a rectangular configuration. A plurality of strengthening ribs 36 extend between the frame members 32 in a spaced parallel relationship and are welded at their ends to the latter frame members. The frame sections 30 are supported in the boiler section 10 by virtue of the frame members 34 resting on the upper surfaces of the beams 22 and the upper surfaces of the support members 28.

As better shown in FIGS. 1 and 2 a plurality of horizontally extending, spaced, scalloped bars 38 and 40 are welded to the inner surfaces of the tubes 18 forming the walls 12 and 14 and receive the adjacent side portions of the corresponding frame sections 30 including the frame member 32 of each section. An insulating material, shown in general by the reference numeral 42, is disposed between the latter side portions and the inner surfaces of the walls 12 and 14 as shown in FIG. 2. It is noted that the upper scalloped bar 38 is continuous through the length of the walls 12 and 14 while the lower scalloped bar 40 is in three sections which together extend for the length of the latter walls but which do not extend between the support lugs 24. As shown in FIG. 4, a scalloped bar 43 is welded to the inner surfaces of the tubes 18 forming the sidewalls 16 and cooperates with the support members 28 to define a space for receiving the end portions of the corresponding rows of frame sections 30.

Referring to FIGS. 4 and 5 a pair of locking lugs 44 extend upwardly from the upper surfaces of the beams 22 and are spaced apart in a manner to receive two adjacent, abutting frame members 34. The lugs 44 are disposed at spaced intervals along the beams 22 as shown in FIG. 2 and a nut-bolt assembly 46 (FIG. 5) extends through openings formed in the lugs 44 and corresponding openings formed in the frame members 34. The space between the lugs 44 is slightly greater than the combined thickness of the two frame members 34 and the openings in the lugs 44 are slightly larger than the diameter of the bolts of the nut-bolt assembly to allow for limited lateral movement and vertical movement, respectively, of the frame sections 30 relative to each other and relative to the beams 22. Although not clear from the drawings it is understood that a pair of locking lugs 44 are provided to connect or attach each of the three frame sections 30 extending between the beams 22 to its corresponding adjacent frame section.

A perforated plate, or grid, 50 is associated with each frame section 30 and rests on the upper surfaces of the frame members 32 and 34 and the ribs 36. As shown in FIGS. 4 and 5, each grid 50 is fastened or attached to its respective frame section 30 by a series of nut-bolt assemblies 52 extending through openings formed in the grid 50 adjacent the ends thereof and through corresponding openings formed in a series of lugs 60 extending outwardly from the frame members 34. The openings in the lugs 60 are enlarged so as to permit limited lateral movement of the nut-bolt assemblies 52 and therefore the grid 50 relative to the frame sections 30.

Each grid 50 is also attached or affixed to the frame sections 30 by a plurality of J-bolts 62 extending in a spaced relation along each rib 36. The upper portion of each J-bolt 62 extends through an opening in the grid 50 and is attached thereto by a nut 64, and the lower portion engages the lower surface of its corresponding rib 36 as better shown in FIG. 5. The openings in the grid 50 that receive the J-bolts are enlarged to also provide for limited lateral movement of the grid 50 relative to its corresponding frame section 30. It is noted that the outer edge portions of the grids 50 extend beneath the scalloped bars 38 and 43 which limits the amount of vertical movement of the grids.

Referring to FIGS. 5-7 a landing bar 66 extends around the inner surfaces of the frame members 32 and 34 of each frame section 32 with its upper surface extending flush with the upper surfaces of the latter frame members for receiving the edge portions of the corresponding grid 50. A pair of stop bars 70 are welded to the under surface of the grid 50 along each side thereof in a slightly spaced relationship to each rib 36 to aid in limiting the amount of lateral movement of the grid relative to the frame section 30.

As shown in FIG. 1 a pair of drain pipes 72 are provided in the boiler section 10 and extend through appropriately formed openings in the grid 50, with the ribs 36 being offset as needed to accommodate the pipes.

Although not shown in the drawings it is understood that proper chambers, ducting and the like will be provided beneath the grids and the aforementioned support structure to direct air into and through the grids which in turn will support a material to be fluidized in a conventional manner. The drain pipes 72 function to permit removal of spent material from the bed also in a conventional manner.

It should be appreciated from the foregoing that several advantages result in the unique system of the present invention. For example, the use of separate frame sections with an individual grid connected to each section facilitates removal, installation or replacement of the sections or the grids. Further, the relative movement afforded between the frame sections and between each frame section and the supporting structure as well as the relative movement between the grid and the frame sections will accommodate the relative thermal expansion between the various components.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A system for supporting a fluidized bed in a boiler, said system comprising a plurality of support frames, means for supporting said support frames in an abutting relationship with one another, first attaching means attaching at least a portion of said frames to each other and to said supporting means and permitting limited relative movement between said frames and between each frame and said supporting means, a plurality of grids, each grid supported entirely by one of said support frames, and second attaching means attaching each grid to its respective support frame.

2. The system of claim 1, wherein said second attaching means attaches each grid to its respective support frame in a manner to permit limited lateral movement of said grid relative to said support frame.

3. The system of claim 1 or 2 further comprising means mounted relative to the interior walls of said boiler for supporting the edge portions of the frame members that are disposed adjacent said walls.

4. The system of claim 1 or 2 further comprising means mounted relative to the interior walls of said boiler for limiting the vertical movement of said grids and said frame members.

5. The system of claim 1 or 2 further comprising at least one stop bar mounted on each grid and adapted to engage its respective support frame after a predetermined lateral movement of said grid to limit said lateral movement.

6. A system for supporting a fluidized bed in a boiler, said system comprising a plurality of support frames extending in an abutting relationship with one another, a plurality of grids, each grid supported entirely by one of said support frames, and attaching means attaching each grid to its respective support frame in a manner to permit limited lateral movement of said grid relative to said support frame.

7. The system of claim 6 further comprising means for supporting said support frames in said boiler in a manner to permit limited relative movement between said frames and between each frame and said supporting means.

8. The system of claim 6 or 7 further comprising means mounted relative to the interior walls of said boiler for supporting the edge portions of the frame members that are disposed adjacent said walls.

9. The system of claim 6 or 7 further comprising means mounted relative to the interior walls of said boiler for limiting the vertical movement of said grids and said frame members.

10. The system of claim 6 or 7 further comprising at least one stop bar mounted on each grid and adapted to engage its respective support frame after a predetermined lateral movement of said grid to limit said lateral movement.

11. A system for supporting a fluidized bed in a boiler, said system comprising a plurality of support frames, each support frame including a plurality of frame members, means for supporting said support frames in an abutting relationship with one another, a plurality of pairs of lugs secured to the supporting means, a frame member from each of two of the abutting support frames positioned between each pair of lugs, the lugs being spaced apart a distance greater than the combined thickness of the two frame members so that limited relative movement is permitted between said frames and between each frame and said supporting means, a plurality of grids, each grid supported entirely by one of said support frames, and connecting means connecting each grid to its respective support frame.

12. The system of claim 11 wherein openings extend through the lugs and through the frame members between the lugs and bolts are positioned through the openings, the openings in the lugs being slightly larger than the diameter of the bolts to permit limited vertical movement of the frame members relative to each other and relative to the supporting means.

13. A system for supporting a fluidized bed in a boiler, said system comprising a plurality of support frames extending in an abutting relationship with one another, a plurality of grids, each grid supported entirely by one of said support frames, lugs secured to the support frames parallel to the grids, corresponding openings defined in the grids and in the lugs, and bolts positioned in the openings, the openings in the lugs being larger than the diameter of the bolts to permit limited lateral movement of the grids relative to the frames.

14. A system for supporting a fluidized bed in a boiler, said system comprising a plurality of support frames, means for supporting said support frames in an abutting relationship with one another, first connecting means connecting at least a portion of said frames relative to each other and to said supporting means in a manner to permit limited relative movement between said frames and between each frame and said supporting means, a plurality of grids, each grid supported entirely by one of said support frames, second connecting means connecting each grid to its respective support frame, and at least one stop bar mounted on each grid and adapted to engage its respective support frame after a predetermined lateral movement of said grid to limit said lateral movement.

15. A system for supporting a fluidized bed in a boiler, said system comprising a plurality of support frames extending in an abutting relationship with one another, a plurality of grids, each grid supported entirely by one of said support frames, connecting means connecting each grid to its respective support frame in a manner to permit limited lateral movement of said grid relative to said support frame, and at least one stop bar mounted on each grid and adapted to engage its respective support frame after a predetermined lateral movement of said grid to limit said lateral movement.

* * * * *